(12) United States Patent
Byström

(10) Patent No.: US 10,913,098 B2
(45) Date of Patent: Feb. 9, 2021

(54) METHOD, ARRANGEMENT AND PRODUCTION LINE FOR MANUFACTURING A PARABOLIC TROUGH SOLAR COLLECTOR

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

( * ) Notice: Subject to any disclaimer, the term of this patent is extended or adjusted under 35 U.S.C. 154(b) by 0 days.

(21) Appl. No.: 16/764,166

(22) PCT Filed: Nov. 29, 2018

(86) PCT No.: PCT/SE2018/051230
§ 371 (c)(1),
(2) Date: May 14, 2020

(87) PCT Pub. No.: WO2019/108122
PCT Pub. Date: Jun. 6, 2019

(65) Prior Publication Data
US 2020/0376533 A1    Dec. 3, 2020

(30) Foreign Application Priority Data

Dec. 1, 2017    (SE) ........................................ 1751489
Nov. 27, 2018    (CN) ........................... 2018 1 1428226

(51) Int. Cl.
*B21D 11/10* (2006.01)
*B21D 11/20* (2006.01)
(Continued)

(52) U.S. Cl.
CPC ............ *B21D 11/10* (2013.01); *B21D 11/203* (2013.01); *F24S 20/20* (2018.05); *F24S 23/74* (2018.05); *F24S 23/82* (2018.05)

(58) Field of Classification Search
CPC ........ B21D 11/10; B21D 11/203; F24S 20/20; F24S 23/23; F24S 23/82
See application file for complete search history.

(56) References Cited

U.S. PATENT DOCUMENTS 4,103,672 A    8/1978    Meyer
4,115,177 A    9/1978    Nelson
(Continued)

FOREIGN PATENT DOCUMENTS

JP    S5126554 A    3/1976
WO    03022578 A1    3/2003

OTHER PUBLICATIONS

First Notification of Amendment in corresponding/related Chinese Patent Application No. 201821968614.9 dated Jun. 24, 2019.
(Continued)

*Primary Examiner* — David J Laux
*Assistant Examiner* — Nikhil P Mashruwala
(74) *Attorney, Agent, or Firm* — Patent Portfolio Builders PLLC

(57) ABSTRACT

An arrangement for manufacturing a reflector for a PTC from a rectangular reflective structure. The arrangement comprises a tensioning device configured to tension a reflector portion of the rectangular reflective structure, such that a surface of the tensioned reflector portion acquires a curvature perpendicular to the tensioned reflector portion's longitudinal propagation, along the tensioned reflector portion's longitudinal propagation. The arrangement further comprises a fixating device configured to fixate the surface's curvature, such that the tensioned reflector portion remains tensioned. The tensioning device is configured to tension the reflector portion of the rectangular reflective structure by pre-forming the reflector portion to a pre-curvature, and adjusting the pre-curvature by applying a torque at a longitudinal borderline of the pre-formed portion. Because the
(Continued)

reflector will be maintained tensioned by torques only, it will adapt a curvature of a high precision parabola.

11 Claims, 9 Drawing Sheets

(51) Int. Cl.
*F24S 20/20* (2018.01)
*F24S 23/74* (2018.01)
*F24S 23/70* (2018.01)

(56) References Cited

U.S. PATENT DOCUMENTS

| | | | |
|---|---|---|---|
| 4,119,365 A | 10/1978 | Powell | |
| 4,205,659 A * | 6/1980 | Beam | F24S 23/74 126/578 |
| 4,236,399 A | 12/1980 | Williams et al. | |
| 4,243,301 A * | 1/1981 | Powell | G02B 5/10 359/847 |
| 4,256,091 A * | 3/1981 | Pier St. | F24S 23/745 126/694 |
| 4,268,332 A * | 5/1981 | Winders | B23P 15/00 156/160 |
| 4,493,313 A * | 1/1985 | Eaton | F24S 40/80 126/570 |
| 4,611,575 A * | 9/1986 | Powell | F24S 23/745 126/605 |
| 4,678,292 A * | 7/1987 | Miyatani | F21V 7/16 359/848 |
| 4,731,617 A * | 3/1988 | Gray | H01Q 15/141 343/912 |
| 5,532,710 A * | 7/1996 | Rodeffer | H01Q 15/141 343/912 |
| 5,964,216 A * | 10/1999 | Hoffschmidt | F24S 23/74 126/696 |
| 6,035,850 A * | 3/2000 | Deidewig | F24S 23/74 126/696 |
| 7,950,387 B2 * | 5/2011 | Kimura | F24S 23/81 126/696 |
| 8,443,795 B2 * | 5/2013 | Kimura | F24S 23/745 126/696 |
| 8,596,802 B2 * | 12/2013 | Gandhi | F24S 23/745 359/846 |
| 8,915,244 B2 * | 12/2014 | von Behrens | F24S 23/79 126/692 |
| 9,405,091 B2 * | 8/2016 | Boeman | G02B 7/188 |
| 10,584,900 B2 * | 3/2020 | von Behrens | F24S 40/10 |
| 2014/0182578 A1 * | 7/2014 | Fortin | F24S 10/45 126/600 |

OTHER PUBLICATIONS

Office Action in corresponding/related Swedish Application No. 1751489-4 dated Jun. 21, 2018. (All references not cited herewith have been previously made of record.) Regarding this cited non-English language document identified as "2017-06_SE_Föreläggande_20180621", and as required by 37 CFR 1.98 (a)(3)(i), the reason that this document is relevant is that it is an Office Action from another Patent Office issued in connection with a family member of this U.S. Patent Application.

International Preliminary Report on Patentability dated Feb. 5, 2020 in related/corresponding PCT Application No. PCT/SE2018/051230.

International Search Report/Written Opinion dated Feb. 8, 2019 in related/corresponding PCT Application No. PCT/SE2018/051230.

Supplemental European Search Report in corresponding/related European Application No. 18884480 dated Oct. 15, 2020 (all references not cited herewith have been previously made of record).

* cited by examiner

METHOD, ARRANGEMENT AND PRODUCTION LINE FOR MANUFACTURING A PARABOLIC TROUGH SOLAR COLLECTOR

TECHNICAL FIELD

This disclosure relates to energy supply, especially to construction solutions in systems for solar energy production.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which negatively affects our environment significantly in a negative way. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar panels, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focus-line of the reflector. The receiver is commonly a black tube filled with a transport fluid, such as water, glycol, or oil. The tube is heated by the concentrated solar radiation and the heat is transferred to the transport fluid that is circulated in a system where the hot transport fluid could be used. The heated transport fluid may be used both as process heat in industrial processes as in district heating.

The term "PTC" (Parabolic Trough solar Collector) will be used in this disclosure to denote a concentrating solar collector with a trough-formed reflector arranged to concentrate solar light onto a fluid tube. Typically, PTCs will be pivoted to track the sun during the day. They will then be controlled by a solar tracking arrangement.

A parabolic trough solar collector comprises an elongated reflector, which reflective surface in a cross-section describes a parabolic curve. The reflector focuses direct sunlight on a focus. In mathematical terms, such parabola has the properties "curve", "focus", "Latus rectum", and "optical axis of symmetry". The parabolic through's "optical plane of symmetry" is defined by extending the parabolas axis of symmetry along the longitudinal direction of the trough.

With reference to FIG. 1, which is a schematic illustration in a perspective view, an existing arrangement 100 for manufacturing a parabolic trough 102 will now be described, according to an example.

When forming the parabolic trough 102, a metal sheet is first bent close to its longitudinal edges of the sheet to form two opposite located brims. Each of the brims is fixated between a respective pair of rails 104 by clamps 106. The rail 104 pairs are forced against each other by adjustment means 108. The metal sheet 102 will then be tensioned, such that a cross-section of the metal sheet 102 perpendicular to the z-axis in FIG. 1, adopts a substantial parabolic curvature. The tensioned metal sheet 102 is heated to release stress of the material of the metal sheet 102, such that the metal sheet 102 maintains the achieved curvature after removal of the adjustment means 108.

An example of a method for forming a parabolic trough is disclosed in the patent publication U.S. Pat. No. 4,236,399.

It is a challenge to achieve improved precision of reflector curvatures.

SUMMARY

It would be desirable to increase heat output in thermal solar energy systems. It is an object of this disclosure to address at least one of the issues outlined above.

Further there is an object to provide a mechanism that enables reflectors of parabolic trough solar collectors to be manufactured with improved precision of curvature shape. These objects may be met by an arrangement according to the attached independent claims.

According to a first aspect, a method is provided for manufacturing a reflector for a PTC (Parabolic Trough solar Collector) from a rectangular reflective structure. The method comprises tensioning a reflector portion of the rectangular reflective structure, such that a surface of the tensioned reflector portion acquires a curvature perpendicular to the tensioned reflector portion's longitudinal propagation, along the tensioned reflector portion's longitudinal propagation. The method comprises further fixating the surface's curvature, such that the tensioned reflector portion remains tensioned. In the method tensioning the reflector portion of the rectangular reflective structure comprises pre-forming the reflector portion to a pre-curvature, and adjusting the pre-curvature by applying a torque along a longitudinal borderline of the pre-formed reflector portion.

Furthermore, the method may comprise an action of bending an end portion along a longitudinal borderline (i.e. bending a longitudinal end portion), wherein applying the torque is performed by applicating a force at the end portion, when the borderline is fixated and constitutes a fulcrum. The bent end portion constitutes then a longitudinal end portion extending along the reflector portion's longitudinal propagation.

According to another aspect, an arrangement is provided for manufacturing a reflector for a PTC (Parabolic Trough solar Collector) from a rectangular reflective structure. The arrangement comprises a tensioning device configured to tension a reflector portion of the rectangular reflective structure, such that a surface of the tensioned portion (i.e. tensioned reflector portion) acquires a curvature perpendicular to the tensioned reflector portion's longitudinal propagation, along the tensioned reflector portion's longitudinal propagation. The arrangement further comprises a fixating device configured to fixate the surface's curvature, such that the tensioned portion (i.e. tensioned reflector portion) remains tensioned. The tensioning device is configured to tension the reflector portion of the rectangular reflective structure by pre-forming the reflector portion to a pre-curvature, and adjusting the pre-curvature by applying a torque at a longitudinal borderline of the pre-formed portion.

The arrangement may further comprise a fixture means and securing means for temporarily securing the reflector portion to the fixture means when an adjustment means applicates a force of a bent end portion of the reflective rectangular sheet. The force may then be converted into a torque at the borderline between the reflector portion and the end portion when the borderline is fixated as a fulcrum.

By forming the reflector portion in two actions, first pre-shaping a pre-curvature according the fixture means and then adjusting the pre-curvature by applying a torque at the reflector, no forces will be acting at the reflector portion after the PTC has been removed from the fixture means, only torques. Because the reflector is maintained tensioned by torques only, it will adapt a curvature of a high precision parabola.

BRIEF DESCRIPTION OF DRAWINGS

The solution will now be described in more detail by means of exemplifying embodiments and with reference to the accompanying drawings, in which.

DETAILED DESCRIPTION

Applying forces to a metal sheet can give a cross section that is approximate parabolic. However, the efficiency of a parabolic trough reflector is highly effected by the shape, i.e. the curvature of the reflector and even small deviations from the ideal parabolic form may cause losses that makes the final product economical unfeasible.

This document shows how to fine adjust a parabolic trough reflector to obtain a very high degree of optical perfection and a reflector with less than 0.2 degrees deviation over the surface.

Normally, when holding on to the edges and bending a flexible metal sheet, the metal sheet is affected by both forces and torques and those are together shaping the curvature of the metal sheet. To have the metal sheet only to be affected by torques, all forces must be cancelled, a task nearly impossible without complex special arrangements.

Several methods have been described to manufacture a parabolic trough with applied forces and torques. In general, they are sensitive to material properties, deformations at the edge of the metal sheet and different distances.

Most methods use forces to pull or push the metal sheet into an approximate parabolic shape.

Figure 3A:
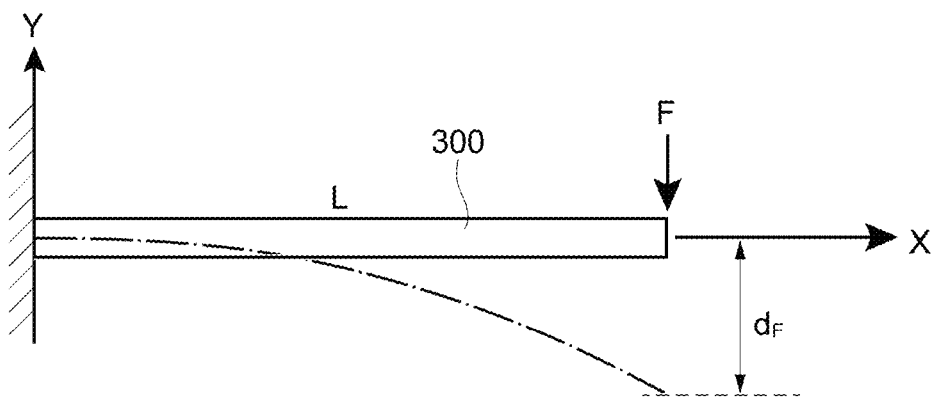
FIGS. 3a-d are schematic illustrations of principles for forming a metal sheet.

However, as will be further described e.g. with reference to FIG. 3a, the shape of a metal sheet that is affected by forces on its edge can be expressed as a polynomic equation with several factors not proportional $x^2$ in the cross-section. Those forces deflect the shape from the ideal equation $y=kx^2$, where k is a constant. Reduction of factors that deflects the shape from the ideal would of course be advantageous and desired. However, forming a trough shaped reflector without applicating forces near its ends is complex, complicated, and therefore these unwanted factors traditionally have been overlooked.

It would be desired to form the trough shaped reflector by applicating torques instead of forces at the edges, as will be described e.g. with reference to FIG. 3b. However, introducing torques at the edges without simultaneously affecting the reflector with any forces is complex and in practice almost not possible.

This document shows how to cancel out the forces using a fixture means, shaped into the required parabolic shape in combination with an adjustable force $F_M$ and an opposite directed counter force $F_G$ to create a torque at the brim. By, in a first action temporarily fixating the metal sheet in the fixture means, the curvature of the metal sheet is pre-shaped, but at the cost of many forces from the fixture means affecting the metal sheet.

However, in a second step, the force $F_M$ and the counter force $F_G$ are introduced to affect the brim. The magnitude of $F_M$ is adjusted to create the torque required to obtain the exact parabolic shape after the pre-formed metal sheet will be removed from the fixture means. The resulting adjusted metal sheet will be a high precision shaped parabolic trough with where all forces are cancelled out. This process will be further described below e.g. with reference to FIG. 3d.

As will be disclosed in some embodiments, a possible solution where the reflector portion is tensioned by applicating forces, fixated such that the tension remains also when the forces are removed results in a reflector portion which will be affected by torques only.

Thus, when the forces that effect the reflector portion can be eliminated completely, the sheet will adopt an exact parabolic shape as, a theoretical result that has been confirmed by our experiments.

This document shows how the forces can be eliminated and the torque exactly adjusted even with considerable material and production defects, making possible a production line for concentrating solar collectors with unsurpassed optical efficiency.

With reference to the FIGS. 2a-c, which are schematic illustrations, some principles of forming a parabolic trough reflector will now be described in accordance with one exemplifying embodiment. The figures are cross-sectional views perpendicular to a longitudinal axis of a PTC (Parabolic Trough solar Collector) to be manufactured.

Figure 1:
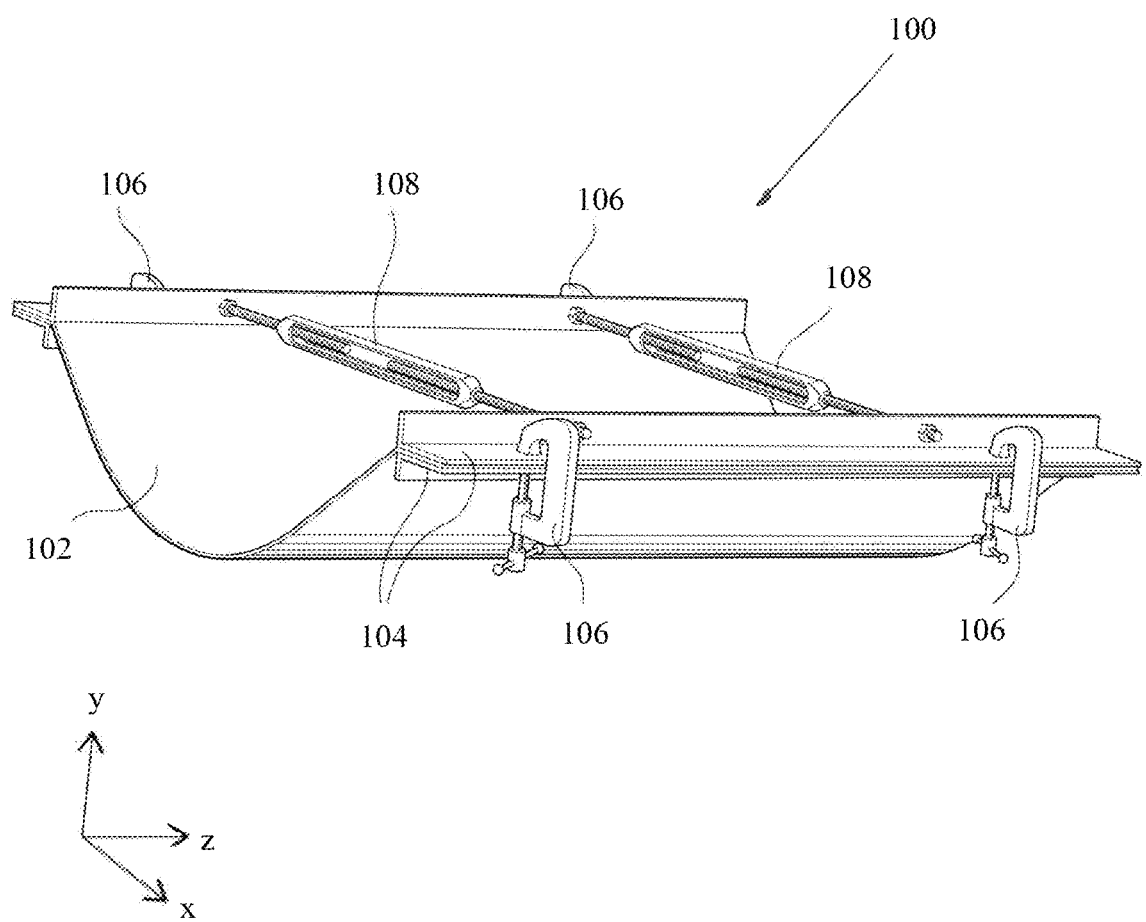
FIG. 1 is a schematic environmental illustration of a reflector in accordance with existing art.
Figure 2A:
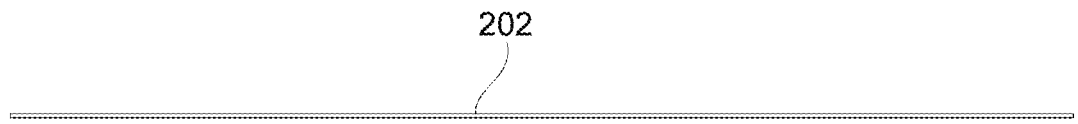
FIGS. 2a-f are schematic illustrations of steps for forming a reflector, in according with existing art.

In FIG. 2a a sheet formed reflective metal structure 202 is shown. The metal structure has been coated with a reflective material on an upper side, typically by sputtering or by laminating a reflector foil onto the metal structure. The reflective metal structure 202 may be provided in form of a coil and have a width of about 1 meter. The metal structure is cut to a sheet of an appropriate longitudinal length of the PTC to be manufactured, e.g. 5.5 metres.

Figure 2B:
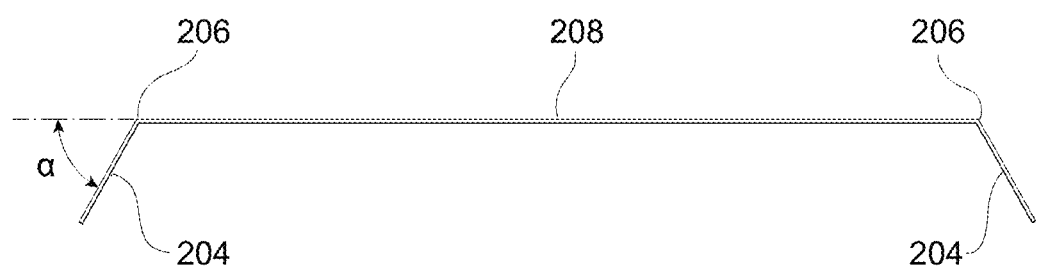

In FIG. 2b, the sheet formed reflective metal structure 202 has its longitudinal edges bent down an angle α along respective borderlines 206 to form respective end portions 204. Between the end portions a reflector portion 208 is thereby achieved. An appropriate angle α is between 40° and 55°, and will be further discussed below in conjunction with other embodiments.

Figure 2C:
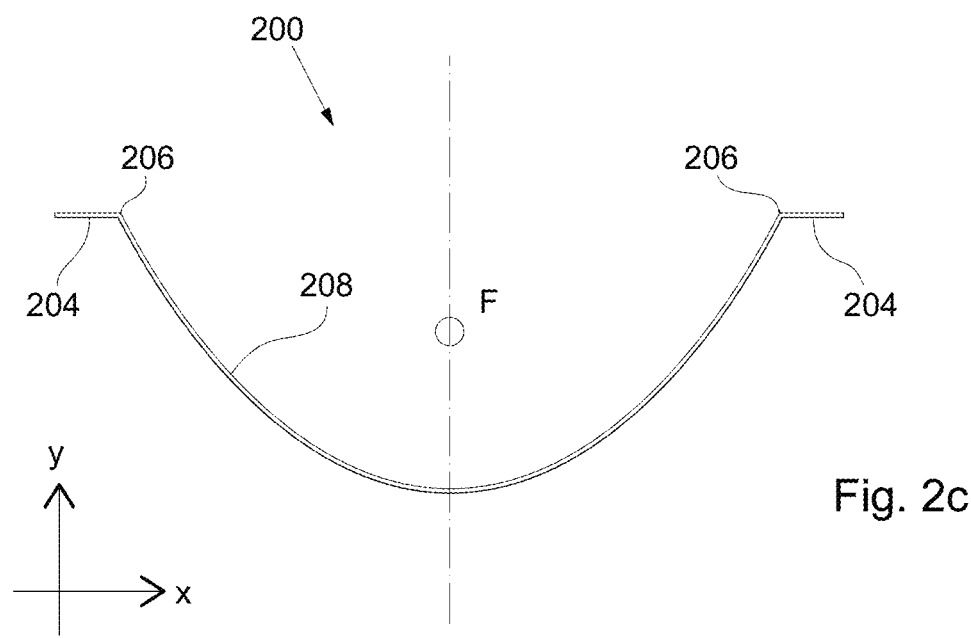

In FIG. 2c, the PTC is illustrated after the reflector portion 208 has been formed such that its upper surface's cross-section has adapted a form of a parabolic curve. In this embodiment the parabolic curve is according to the function $y=x^2$ without being limited thereto. The end portions 204 are parallel with a latus rectum of the parabolic curve. In the cross-sectional view of FIG. 2c is also a focal line F (directed perpendicular through the paper along the longitudinal propagation of the reflector portion) and an optical plane of symmetry (dash-dotted) shown. The result is a reflector 200 with the reflector portion 208 and end portions 204. The directions are indicated with a coordinate system in FIG. 2c, where the y-axis coincides with the optical axis of symmetry (dash-dotted) and the x-axis is perpendicular with the y-axis. A z-axis could be defined as the reflector's longitudinal propagation along the focal line F, i.e. perpendicular through the paper.

It is a challenge to form the reflector portion 208 with a cross-section that follows the parabolic curve with high precision, especially close to the borderlines 206. A proposed process for producing a reflector 200 where the reflector portion 208 has improved precision, e.g. the cross-section more closely follows an ideal parabolic curve such as $y=x^2$, will be discussed below in some embodiments.

With reference to the FIGS. 2d-2f, which are schematic illustrations, some examples of reflectors or parts of reflectors will now be described in accordance with exemplifying embodiments. In the FIGS. 2d-2f the longitudinal focus-lines have been illustrated as dash-dotted lines.

Figure 2D:
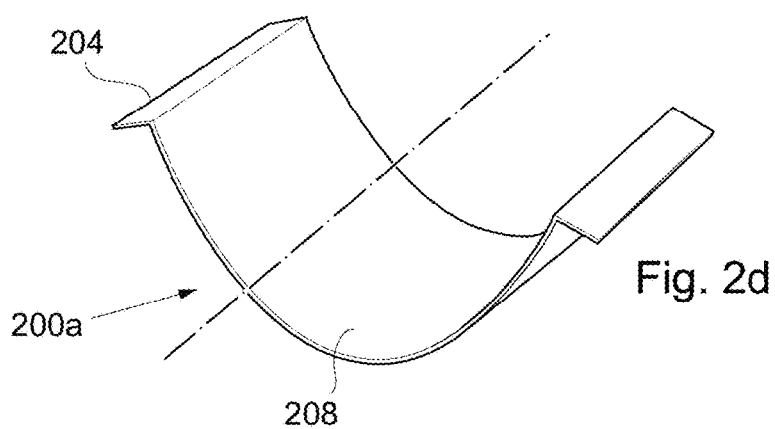

FIG. 2d shows a part of a reflector, where a reflector sub-portion 200a has been made and where two short ends constitute respective longitudinal end portions.

Figure 2E:
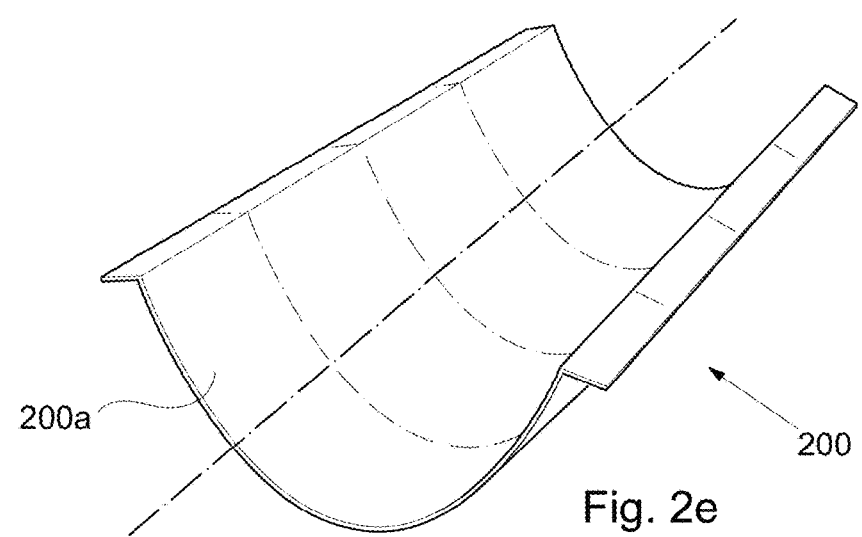

FIG. 2e shows how a plurality of such sub-portions have been joined together into a complete reflector 200. In the FIG. 2e, four sub-portions 200a have been put together as an example, but the inventive concept is not limited to any specific number of sub-portions.

Figure 2F:
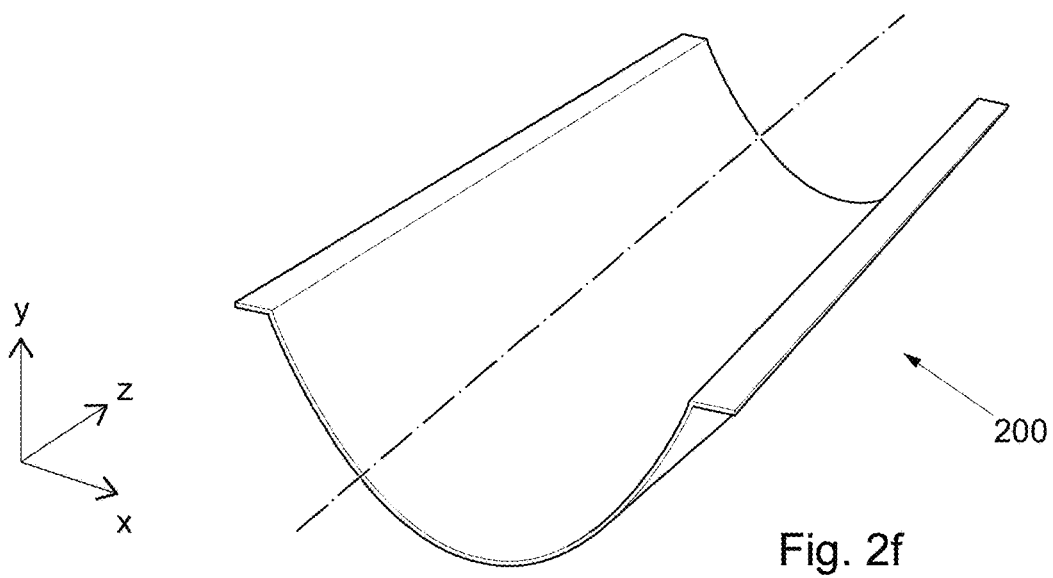

FIG. 2f shows a complete reflector 200 manufactured from one single reflective metal sheet, where two long ends constitute respective longitudinal end portions.

Thus, the reflector is not limited to be manufactured in one single section but may consist of sub-portions that are joined together. As seen in the figures, the longitudinal end portions may be formed at either the short ends of the reflective metal sheet as in FIG. 2d, or the long ends as in FIG. 2f.

With reference to the FIGS. 3a-b, which are schematic illustrations, some principles of mechanical strain will now be discussed in accordance with one example. In both figures a metal sheet is fixed in a solid wall. The metal sheet extends a length L from the solid wall. Both figures are cross-sectional views and the metal sheet protrudes through the paper in the figures, i.e. along the z-axis (not shown) in a coordinate system.

In FIG. 3a, the metal sheet has a force F applied at its free edge, which results in that the free edge is tensioned down a lateral distance $d_F$ below the x-axis. It is defined within literature that for a point of the metal sheet at a horizontal distance x from the solid wall, the lateral displacement y along the y-axis is according to the equation $y=FL^3/6EI*(x^3/L^3 - 3x^2/L^2)$, where E and I are constants of elasticity and intracity, and L is the width of the metal sheet. It is understood from the equation that the lateral displacement y depends on the factors $x^3/L^3$ and $3x^2/L^2$, where the second factor defines a parabolic function which will adapt the metal sheet's shape to a part of a parabola (dash-dotted in FIG. 3a). The first factor $x^3/L^3$ prevents the metal sheet to adapt the shape of a perfect parabola. It would be desired to limit the first factor in order to improve precision of the reflector portion's shape when manufacturing a parabolic trough reflector portion.

Figure 3B:
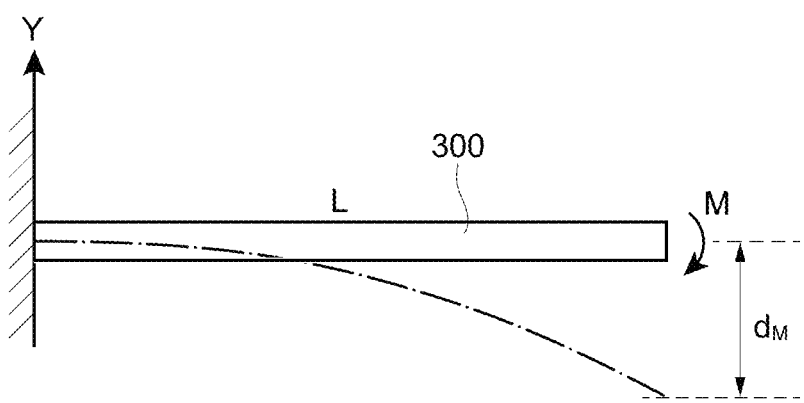

In FIG. 3b, instead of a force F, the free edge is affected by an applied torque M. The x-axis is omitted in FIG. 3b to not disturb, but extends through the unbent free edge correspondingly to in FIG. 3a. The free edge is tensioned down a lateral distance $d_M$ below the x-axis. The equation that defines the lateral displacement y along the y-axis is instead $y=-Mx^2/2EI$. Thus, the equation contains only one factor and this factor is proportional to $x^2$, and by applicating a torque M only and no force F, the cross-section of the metal sheet will better adapt the shape of a parabola.

However, applying a torque M at the free edge without affecting the edge with a force F at the edge is a complicated challenge, and in practice almost impossible in one action (i.e. in one single action). A method of manufacturing a reflector portion in some actions where the ends of the resulting reflector portion, i.e. the final product, as a result is affected by torques M only, will be described below in other embodiments.

Figure 3C:
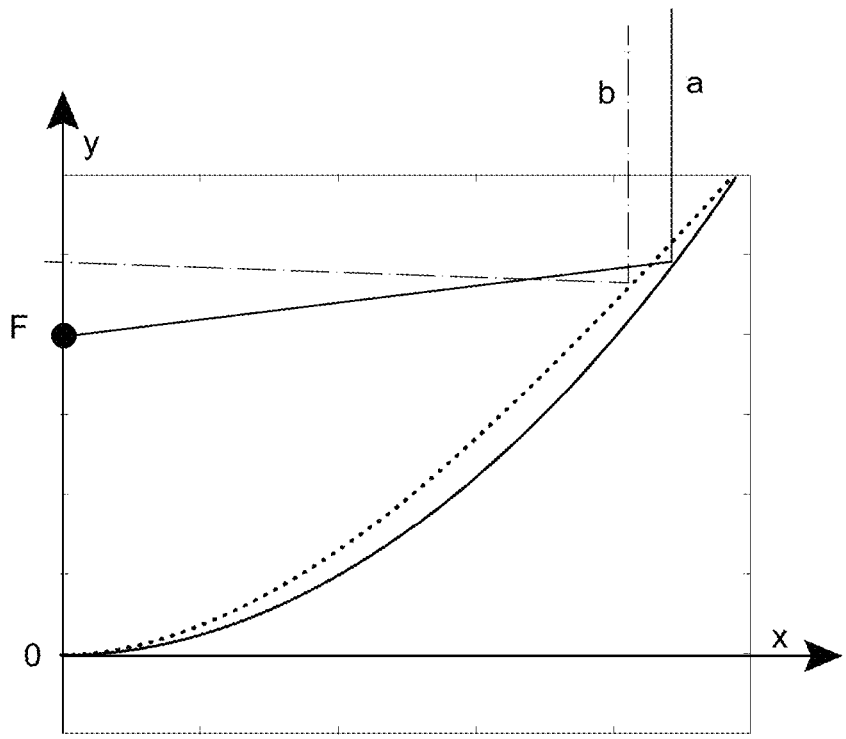

With reference to FIG. 3c a schematic graph of two situations of mechanical strain of a metal sheet is illustrated.

In FIG. 3c, the metal sheet is illustrated when it is fixed at an optical plane of symmetry, i.e. at the origin O of the illustrated coordinate system. When the metal sheet is affected by a force at its upper end its curvature will approach the dotted line which is not a proper parabolic function. However, when the metal sheet instead is affected by a torque only, its curvature will approach a parabolic function (solid line in FIG. 3c). Thus, by affecting the metal sheet with torques instead of forces at the upper ends (e.g. along its edges), the curvature will ideally adapt to a parabola along its length (i.e. longitudinal propagation). An effect of this improvement is that the reflected concentrated solar radiation will be directed towards the focus-line F of the PTC, and contribute to that more concentrated solar radiation hits the focus-line F and could be taken care of Therefore, the improved precision of the curvature form contributes to increased heat output. In FIG. 3c the sunbeam a reflected by the torque-affected reflector hits the focus F, while the sunbeam b reflected by the force-affected reflector will miss the focus F.

Figure 3D:
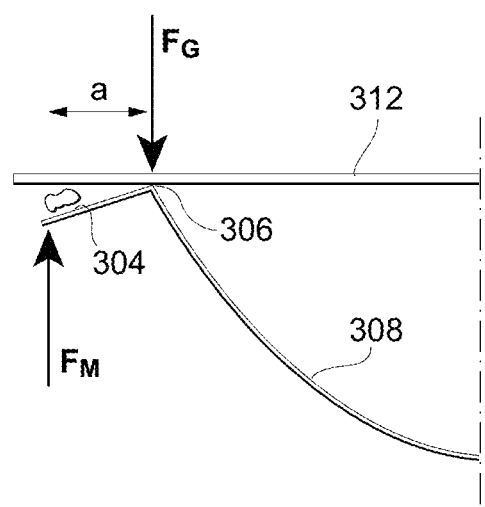

With reference to FIG. 3d, which is a schematic cross-sectional view of the metal reflector portion described in conjunction with another exemplifying embodiment, some principles of forming a metal sheet to a parabolic curvature will now be described in accordance with one exemplifying embodiment.

In FIG. 3d one half of a metal sheet's cross section is illustrated to the left of a plane of symmetry. In the embodiments described with reference to the FIG. 3d, forming of a reflector is described and the plane of symmetry of the for the metal sheet will there be referred to an optical plane of symmetry.

The metal sheet has been bent along a longitudinally extending fulcrum line 306. In the cross-sectional view of FIG. 3d, the fulcrum line 306 is shown as a fulcrum point, the fulcrum line extending through the paper. When being bent the metal sheet comprises a first portion 308 (reflector portion) and a brim 304. The brim 304 constitutes a longitudinal end portion extending along the reflector's longitudinal propagation. A cover glass 312 is arranged and contacts the reflector along the fulcrum line 306. When the metal sheet is fixated at the plane of symmetry and close to the fulcrum line 306, a force $F_M$ applied at the brim 304 achieves a torque $M=F_M*a$, where a is the perpendicular distance to the applied force $F_M$. The cover glass 312 give rise to a counterforce $F_G$ which balances the applied force $F_M$. $F_G$ is directed opposite to $F_M$ and through the fulcrum line 306 and will therefore not affect the torque M.

The torque M may be adjusted by changing the magnitude or size of the force $F_M$. Another way to adjust the torque M would be to move the brim 304 horizontally to a specific position. One advantage of adjusting the force $F_M$ is that the neither the angle of the brim 304 nor the lateral position of the brim's edge affect the resulting torque M.

It can be noted, that as long as sum of the variable torque adjustment force $F_M$ is smaller or equal to the total weight of the cover glass for the shown trough half, $F_M$ will be cancelled out by the weight of the glass $F_G$ for that half. The design of the fixture means may however also contribute to the counter force. But when the cover glass 312 has been locked in position to the brim 304 by a fastening means, e.g. glue, and the solar collector has been removed from the fixture means, the torque adjustment force $F_M$ will now be applied by the fastening means instead and be the only force that contributes to the torque M. The torque adjustment force $F_M$ is balanced with the counterforce $F_G$ such that $F_M+F_G=0$, but $F_G$ is directed through the fulcrum line 306 and will not affect the torque M. By controlling the magnitude of the force $F_M$ a precise regulation of the torque M can be achieved, which results in a further improved precision of the parabolic form. For instance, the force $F_M$ may be controlled by a compressed air spring.

It should be noted that even if the term "cover glass" is applied in some of the embodiments in this disclosure to denote a transparent material that could be fastened at the temporarily secured pre-formed portion to maintain the tension of the reflector portion, the term should be interpreted widely in a non-limiting way. Glass as material for covering and maintaining the tension is one suitable material example, but alternative cover materials may be used instead within the inventive concept where appropriate, e.g. transparent plastics. Except to protect the reflector surface from being affected by environmental factors as rain, snow, dust, sand, etc., the task of the cover glass is to maintain the tension without substantially preventing direct solar radiation from reaching the reflector surface.

Therefore, as well transparent covers and non-covering constructions for maintaining a tension of the reflector portion are appropriate implementation examples of "tension maintaining elements" within the inventive concept. These tension maintaining elements maintain the tension by conserving the torque M applied when applicating the force at the bent longitudinal end portions of the rectangular reflective structure.

In an alternative exemplifying embodiment (not shown) that is related to the above described one, instead of a cover glass a mechanical construction that is fastened in the bent longitudinal end portion for maintain the tensioning, i.e. for locking in the applied torque M. The mechanical construction of this embodiment is a plurality of wires that are fastened in the longitudinal end portions.

With reference to the FIGS. 4a-d, which are schematic views of a PTC's cross-section perpendicular to the PTC's longitudinal propagation, will now be described in accordance with one exemplifying embodiment. Typically, when forming a reflector, the reflective metal sheet will be formed to result in one reflector portion with two end portions on opposite sides, which is symmetric about the PTC's optical plane of symmetry, i.e. the reflector portion has one half on each side of the optical plane of symmetry. In order to facilitate the understanding, the embodiment below will be described for only one half of such reflector, and only one side of the PTC's optical plane of symmetry. However, the inventive scope is not limited thereto and two reflector halves may be connected at the optical plane of symmetry, as will be further explained below in conjunction with other exemplifying embodiments.

Figure 4A:
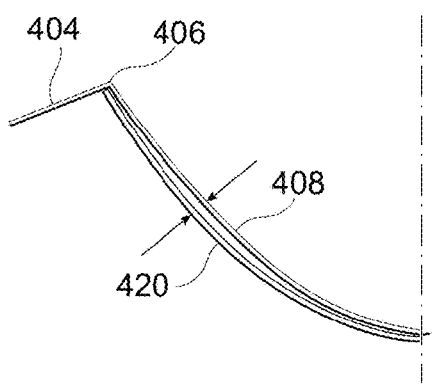
FIGS. 4a-d are schematic illustrations of steps for forming a reflector, according to possible embodiments.

FIG. 4a illustrates a part of a reflective metal sheet from which an end portion 404, i.e. a brim, has been bent to the left of and along a border-line 406, i.e. a longitudinal border-line directed along the longitudinal propagation of the reflective metal sheet and in the figure directed perpendicular through the paper. On the right side of the border-line 406, a reflector portion 408 remains. An optical plane of symmetry for the PTC is illustrated as dash-dotted. A fixture means 420 is also present. The shape of the fixture means' 420 cross-section is about a parabola, and its extension on the other side of the optical plane of symmetry is dotted in FIG. 4a. In practice the shape of the fixture means' 420 cross-section is slightly different to compensate for the thickness of the metal sheet. Thus, due to this compensation the reflector portion pre-formed by the fixture means 420 will get its reflective surface according to the parabolic curve. The reflective metal sheet has got its end portion 404 bent with plastic deformation and its reflector portion 408 is placed in the fixture 420. When placing the reflector portion 408 in the fixture means 420, it substantially adapts the shape of the fixture means 420 by gravity forces acting at the mass, i.e. the reflector portion 408 is pre-formed by the fixture means 420 to a pre-curvature. However, material characteristics prevents the reflector portion 408 to completely adapt this shape, especially near the edge of the fixture means 420. Even if the reflector portion 408 abuts the fixture means 420 at the optical plane of symmetry and at the fixture mean's 420 end, there will be a gap between the reflector portion and the fixture means, as indicated in the figure by two opposite directed arrows.

Figure 4B:
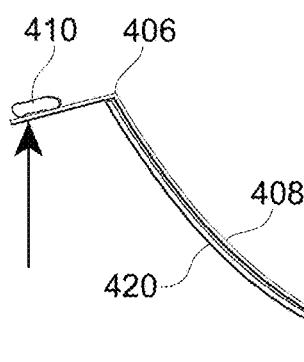

This is partly a cause of that the reflector portion 408 is not only bent using torque, but forces, thus involving the term $x^3/L$ FIG. 4b illustrates a subsequent situation, where the pre-curvature of the reflector portion 408 from FIG. 4a is adjusted. The pre-formed reflector portion 408 is temporarily secured in the fixture means 420. In this embodiment the reflector portion 408 is temporarily secured by suction cups (not shown) of the fixture means 420. However, alternative securing means such as magnets, etc. may be applied instead or in combination with suction cups to achieve the temporary securing, within the inventive scope. In addition, the temporary securing may be achieved by pressing the reflector portion 408 with a jig or corresponding tool towards the fixture means 420. At the end portion 404 a force $F_M$ is applicated to achieve a torque at the border-line 406. I.e. the border-line 406 will constitute a fulcrum. The suction cups do not affect the reflector section 408 with any deforming forces, they merely secure the reflector portion 408 in the fixture means 420 such that the border-line 406 is immobilised. The applicated force $F_M$ is transferred through the end portion 404 and reflector portion 408 and achieves a tensioning of the reflector portion 408. When the force $F_M$ presses the end portion 404 upwards in FIG. 4b, the reflector portion 408 will approach the fixture means 420 and abut to it. The securing means, i.e. the suction cups follow the backside of the reflector portion when approaching the fixture means 420.

In FIG. 4b also a fastening means in form of a line of glue 410 has been applicated.

Figure 4C:
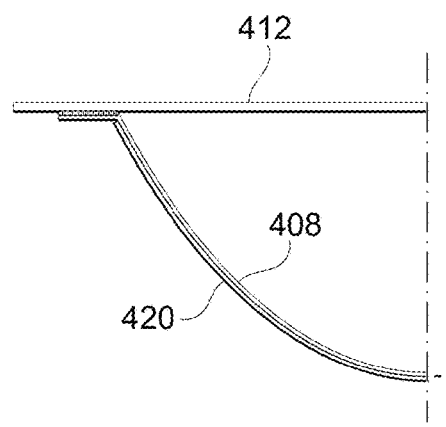

In FIG. 4c, in a following situation, and as a result of the applied torque the reflector portion 408 has now adapted the shape of the fixture means 420. A cover glass 412 (i.e. a tension maintaining element) is fastened with the line of glue 410 to secure the tensioning of the reflector portion 408. In order to ensure a reliable tensioning of the reflector portion 408, the cover glass 412 is also fastened in another end, e.g. at another end portion 404 of a symmetrically connected reflector portion 408 or at an appropriate solid structure. In FIG. 4c the cover glass 412 has been arranged, and the line of glue 410 fills out the connection surface to the end portion 404. When the cover glass 412 is reliably fastened, i.e. when the line of glue 410 has hardened, the fulcrum, i.e. the border-line 406 is fixed positioned at the cover glass 412. In addition, the task of applying the force $F_M$ is taken over by the cover glass 412, such as instead of pressing the end portion 404 (by mistake earlier referred to as 408 in the Swedish patent application SE from which this patent application claims priority) upwards by a liftable support the end portion 404 is pulled upwards by the cover glass 412. Thereby, the reflector portion 408 will be constantly tensioned by the applied torque at the border-line 406. Thus, both the temporary securing in the fixture means 420, and pressing force $F_M$ by the liftable support may be released.

Even if the reflector portion 408 and the fixture means 420 for illustrative purposes are shown as having a small gap therebetween, in practice they abut each other without any gap. At each abutting point a force which contributes to a decreased precision of the reflector portion's 408 shape is achieved. As described in conjunction with the embodiments described with reference to FIG. 3a, forces on a sheet introduces a factor which is not proportional to the function $y=x^2$.

Figure 4D:
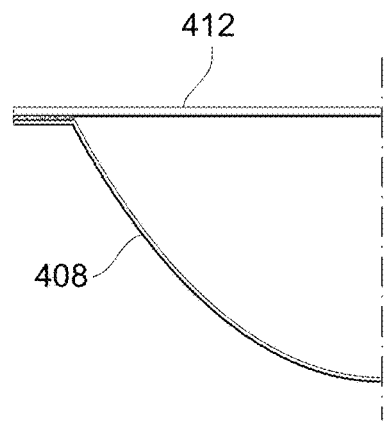

FIG. 4d illustrates the situation when the reflector with reflector portion 408 and its fastened cover glass (i.e. tension maintaining element) 412 has been removed from the fixture means 420. Because the reflector portion 408 is no longer in contact with the fixture means 420 no forces will act on the outer surface of the reflector portion 408, i.e. on the reflector portions convex surface. Thereby the reflector portion 408 will be prevented from being deformed and a more precise reflector surface could be achieved which may improve heat output further of a PTC.

Figure 5:
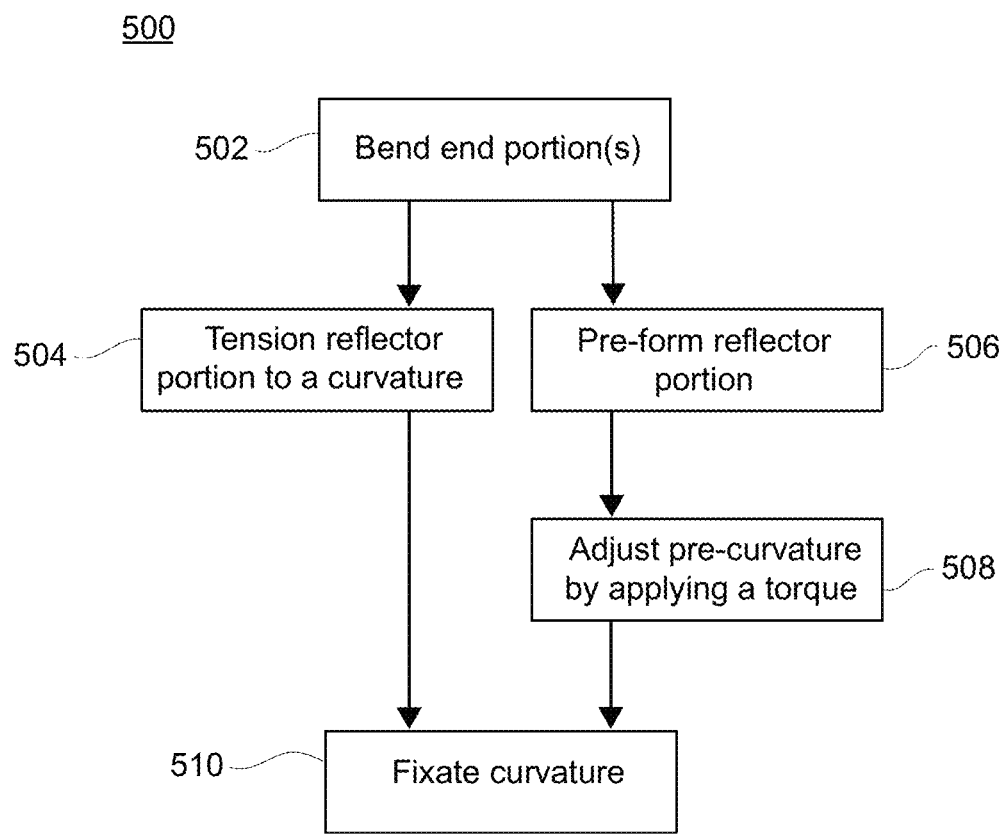
FIG. 5 is a schematic flow chart of a method for forming a reflector, according to possible embodiments.

With reference to FIG. 5, which is a schematic flow chart, a method 500 of manufacturing a reflector for a PTC will now be described in accordance with one exemplifying embodiment.

In an action 504, a reflector portion of a rectangular reflective metal sheet is tensioned such that a surface of the tensioned reflector portion acquires a curvature perpendicular to the tensioned reflector portion's longitudinal propagation. The tensioning may be performed by applying torques along two opposite located borders of a reflector portion of the rectangular reflective metal sheet.

In a subsequent action 510, the tensioned curvature is fixated such that the applied torques remains, which results in a PTC with a tensioned reflector portion.

In another exemplifying embodiment, which is related to some above described ones, the action 504 of tensioning the reflector portion is performed as two sub-actions 506 and 508. In action 506 the reflector portion is pre-formed to a pre-curvature, and in action 508 the pre-curvature is adjusted by applying the torques. The action 506 of pre-forming may be performed by arranging the reflector portion in a fixture means to adapt the curvature of the fixture means. Arranging the reflector portion may further comprise any of: receiving the reflector portion affected by gravitational forces, pressing or pulling the reflector portion towards the fixture means.

With receiving the reflector portion affected by gravitational forces is meant that the reflector portion is placed in the fixture means, e.g. by being lifted into it, and falls down into the fixture means due to the reflector portion's mass. It is to be noted that this action may be combined with any or both of pushing and pulling in order to achieve an appropriate form of the reflector portion.

In another exemplifying embodiment which is based on some above described ones, in an initial action 502 two end portions or brims are bent along the rectangular reflective metal sheet, i.e. longitudinal end portions are bent along the longitudinal propagation of the reflector to be manufactured. The adjustment 508 of the pre-curvature is then performed by temporarily securing the pre-formed reflector portion in the fixture means, e.g. by a set of suction cups, and during the temporary securing applying the torque by applicating forces at the bent end portions. The fixation 510 may then be performed by fastening a cover glass (i.e. tension maintaining element) at the end portions before releasing the temporary securing in the fixture means and removing the resulting PTC with its fastened cover glass from the fixture means. The fixation 510 may be performed by gluing the tension maintaining element, e.g. the cover glass, at the end portions. However, even if glue is applied in this embodiment, other suitable fastening means may alternatively be applied where appropriate, e.g. screws, clamps, soldering, etc.

In the above described embodiments, the cover glass is fastened and connects two end portions on each side of the optical plane of symmetry, and the resulting reflector is symmetric along the optical plane of symmetry. However, the inventive concept is not limited to symmetric dimensioned PTCs, but may also be applied for asymmetrically dimensioned PTCs, e.g. where the reflector portion is larger on one side of the optical plane of symmetry than on the other side. In addition, the cover glass may connect a plurality of partial reflectors into a resulting sawtooth-like structure. The above described method may easily be amended to manufacture also partial reflectors to be connected with each other. Thus, the disclosed inventive concept will cover both manufacturing of complete reflectors and partial reflectors to be connected e.g. along an optical plane of symmetry.

Therefore, the cover glass which is a tension maintaining element will be fastened at the end portion and at a further structure connected with the tensioned reflector portion. The "further structure" may be another end portion of the same reflector (symmetric or asymmetric). As an alternative, the further structure may instead be an intermediate element that connects partial reflectors arranged together in a sawtooth-like structure.

Figure 6:
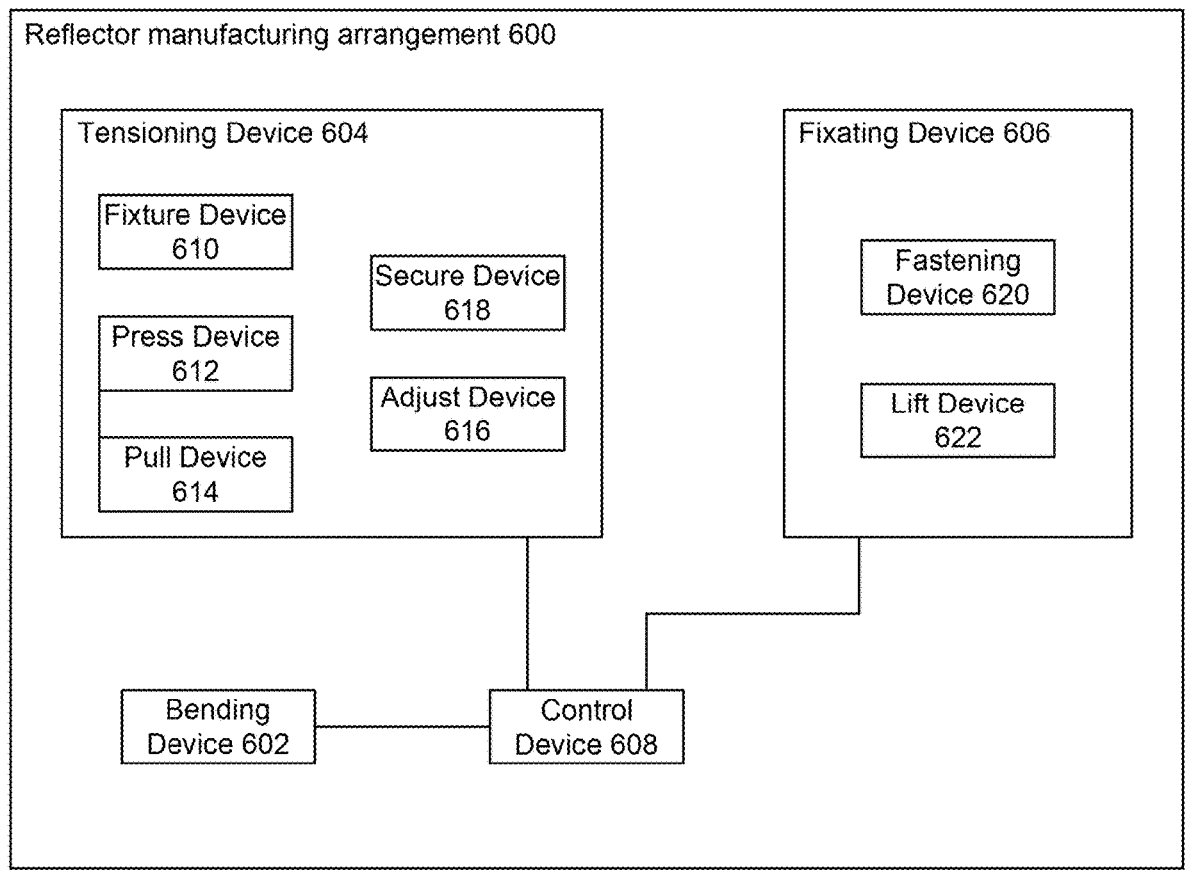
FIG. 6 is a block diagram of an arrangement for manufacturing reflectors, according to possible embodiments.

With reference to FIG. 6, which is a schematic block diagram, an arrangement 600 for manufacturing reflectors or PTCs (Parabolic Trough solar Collectors) will now be described in accordance with one exemplifying embodiment.

The reflectors will be manufactured from a rectangular reflective structure, e.g. a metal sheet which is provided with a reflective coating.

The arrangement 600 comprises a tensioning device 604, a fixating device 606 and optionally a bending device 602. It is to be noted that the arrangement typically comprises various conventional means for controlling and powering the process of manufacturing reflectors. However, except a control unit 608 any such means will not be further discussed in this disclosure.

The tensioning device 604 is configured to tension a reflector portion of the rectangular reflective structure, such that a surface of the tensioned portion (i.e. tensioned reflector portion) acquires a curvature perpendicular to the tensioned reflector portion's longitudinal propagation, along the tensioned portion's (i.e. tensioned reflector portion's) longitudinal propagation. The tensioning device 604 tensions the reflector in two steps, a first step of pre-forming the reflector portion to a pre-curvature, and a second step of adjusting the pre-curvature by applying a torque at a longitudinal borderline of the pre-formed portion.

The fixation device 606 is configured to fixate the tensioned reflector portion such that the surface describes a parabola. I.e. the cross-section of the surface follows a parabolic function, e.g. $y=x^2$.

In one exemplifying embodiment which is based on the above described one, the tensioning device 604 comprises a fixture means 610 and the arrangement 600 is configured to pre-form the reflector portion by arranging it in the fixture means 610 to adapt the curvature of the fixture means 610. To pre-form the reflector portion it may be received by the fixture means 610 when being affected by the gravitational force (as described above), but may alternatively or in combination be pressed or pulled down to the fixture means to better adapt to the fixture's shape. Specific press means 612, or pull means 614 may then be comprised in the tensioning device 604.

In another related exemplifying embodiment, the arrangement 600 for manufacturing reflectors comprises a bending means 602, e.g. a set of rolls, by which the rectangular reflective structure gets a longitudinal end portion bent down an angle, such that the rectangular reflective structure is modified to a reflector portion and an end portion or brim bent along a longitudinal borderline. Both the longitudinal end portion and the longitudinal borderline are parallel with the longitudinal propagation of the reflector to be manufactured and its optical plane of symmetry. In this embodiment the tensioning device 604 comprises an adjustment means 616 and a securing means 618. The adjustment means 616 is configured to temporary secure the reflector portion in the fixture means 610, such that the torque could be applied by applicating a force at the bent down end portion with the adjustment means 616. In this embodiment the securing means 618 is implemented as a set of suction cups distributed at the fixture means 610. The securing means 618 may be implemented alternatively within the inventive concept, e.g. as electromagnets or other means which securing properties may be controlled. In this embodiment the adjustment means 616 are implemented as liftable supports which are configured to applicate a force at the end portion. When lifting the end portion, the securing means 618 holds the reflector portion, such that the borderline constitutes a fulcrum along its length. In practice, the securing means 618 will move minimally, but the borderline will be a fixed fulcrum such that the applied lifting force will be converted into a torque that do not affect the curvature negatively.

In a related embodiment, the fixation device 606 comprises a fastening device 620 which is configured to fixate the reflector portion's curvature, i.e. the surface's curvature, by fastening a cover glass (i.e. tension maintaining element) at the end portion when the reflector portion is maintained temporarily secured and the end portion has been lifted. In this embodiment the fastening device 620 applicates a string of glue at the end portion to fixate the curvature with the fastened cover glass.

Finally, when the cover glass is reliably fastened, the reflector will be lifted from the fixture means 610 as a resulting PTC by a lift means 622. The reflector will then be maintained tensioned by the torque that is locked in by the fastened cover glass, and describe a parabolic curvature. The lift means 622 may further be used to arrange the cover glass at the end portion.

It is to be noted that features of the above described embodiments may be combined when designing the arrangement 600 for manufacturing reflectors.

The above described embodiments have been described for a partial reflector portion with one end portion to facilitate the understanding. However, in practice the arrangement 600 is typically configured to manufacture complete reflector portions. For instance, the arrangement 600 will simultaneously perform the above described actions for a corresponding partial reflector, e.g. provided in one and the same piece, or combing two or more partial reflector portions to a resulting PTC.

With reference to the FIGS. 7a-7b which are schematic perspective views, an arrangement 600 for manufacturing reflectors of a PTC and details of such an arrangement 600 will now be described in accordance with possible exemplifying embodiments. These embodiments are similar to some above described ones and the corresponding reference numbers will be applied when appropriate.

Figure 7A:
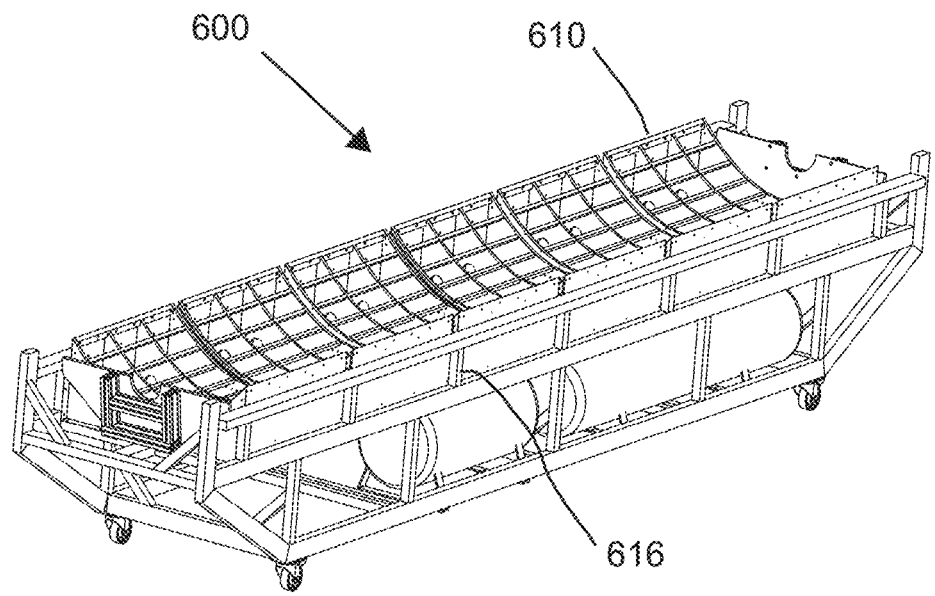
FIG. 7a-b are schematic illustrations of arrangements for forming a reflector, according to possible embodiments.

FIG. 7a illustrates an implementation of an arrangement 600 for manufacturing reflectors. In the figure the fixture means 610 of the tensioning device is shown. The adjustment means 616 in form of a liftable support is also shown. Under the fixture means 610 additional equipment such as control means, pressure tanks, tool holders, etc. could be arranged. The arrangement 600 is in this embodiment provided with wheels as a trolley which can be moved between different locations, e.g. in a production line.

A production line comprising a plurality of such movable arrangements 600 could be implemented where the movable arrangements 600 are driven either motorized or manually along the production line to produce complete PTCs.

Figure 7B:
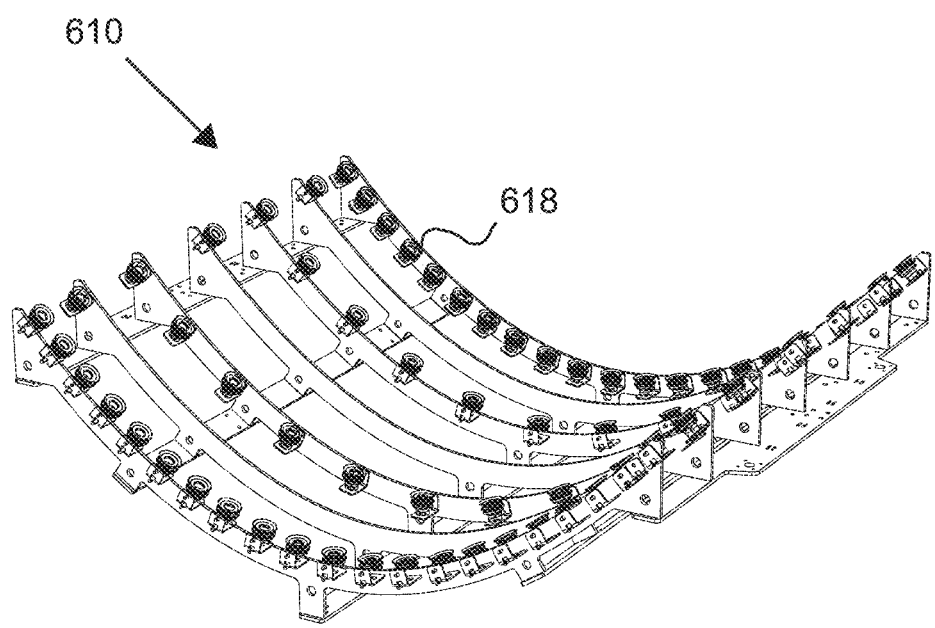

FIG. 7b illustrates a detail of a fixture means 610 where controllable suction cups 618 are arranged as securing means to temporarily secure the reflector portion.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. Method of manufacturing a reflector for a Parabolic Trough solar Collector, PTC, from a rectangular reflective structure, the method comprising:
   bending a longitudinal end portion of the rectangular reflective structure,
   tensioning a reflector portion of the rectangular reflective structure by,
      pre-forming the reflector portion to a pre-curvature, and
      adjusting the pre-curvature by applying a torque along a longitudinal borderline of the pre-formed reflector portion,
      wherein adjusting the pre-curvature comprises:
         temporarily securing the pre-formed reflector portion in a fixture device, and while the pre-formed reflector portion is temporarily secured,
            applying the torque by applying a force at the bent longitudinal end portion,
   such that a surface of the tensioned reflector portion acquires a curvature perpendicular to the tensioned reflector portion's longitudinal propagation, along the tensioned reflector portion's longitudinal propagation, and
   fixating the surface's curvature, such that the tensioned reflector portion remains tensioned by:
      while the force is applicated and the pre-formed reflector portion is temporarily secured in the fixture device, fastening a tension maintaining element at the end portion and at an end portion of a further rectangular reflective structure, the further rectangular reflecting structure having a tensioned reflector portion symmetrically connected with the rectangular reflective structure's tensioned reflector portion, and
      releasing the temporary securing in the fixture device, such that the surface's curvature is fixated by the tension maintaining element.

2. The method according to claim 1, wherein pre-forming the reflector portion comprises arranging the reflector portion in the fixture device, to adapt the shape of the reflector portion to a curvature of the fixture device by performing at least one of:
   pressing the reflector portion towards the fixture device with a press tool, and
   pulling the reflector portion towards the fixture device with a pull tool.

3. The method according to claim 1, wherein the tension maintaining element is a cover glass that is fastened.

4. The method according to claim 1, further comprising:
   connecting the rectangular reflective structure's tensioned reflector portion with the further structure's tensioned reflector portion along the PTC's optical plane of symmetry, or
   simultaneously when tensioning the reflector portion of the rectangular reflective structure, tensioning also the further structure's reflector portion, the further structure being a part of the rectangular reflective structure and is connected by belonging to one and the same piece.

5. Arrangement for manufacturing a reflector comprising:
   a bending device configured to bend a longitudinal end portion of a rectangular reflective structure,
   a tensioning device configured to tension a reflector portion of the rectangular reflective structure by:
      pre-forming the reflector portion to a pre-curvature, and
      adjusting the pre-curvature by applying a torque at a longitudinal borderline of the pre-formed portion,
   such that a surface of the tensioned reflector portion acquires a curvature perpendicular to the tensioned reflector portion's longitudinal propagation, along the tensioned reflector portion's longitudinal propagation, the tensioning device comprises an adjustment device and a securing device configured to adjust the pre-curvature by:
      temporarily securing the pre-formed reflector portion in the fixture device with the securing device and
      while the pre-formed reflector portion is temporarily secured, applying the torque by applicating a force with an elongated liftable support of the adjustment device at the bent longitudinal end portion, the elongated liftable support located beside the fixture device, and
   a fixating device comprising a fastening device, the fixating device being configured to fixate the surface's curvature, such that the tensioned reflector portion remains tensioned, by:
      maintaining the temporary securing of the pre-formed reflector portion in the fixture device with the securing device,
      fastening a tension maintaining element at the end portion and at an end portion of a further rectangular reflective structure with the fastening unit, the further rectangular reflective structure having a tensioned reflector portion symmetrically connected with the tensioned reflector portion, and
      releasing the temporary securing in the fixture device with the securing device, such that the surface's curvature is fixated by the fastened tension maintaining element.

6. The arrangement according to claim 5, wherein the tensioning device comprises a fixture device and is configured to pre-form the reflector portion by arranging the reflector portion in the fixture device to adapt the shape of the reflector portion to a curvature of the fixture device, by performing at least one of:
   pressing the reflector portion towards the fixture device with a press device, and
   pulling the reflector portion towards the fixture device with a pull device.

7. The arrangement according to claim 5, wherein the securing device comprises a plurality of suction cups configured to be controlled by the tensioning device and the fixating device separately.

8. The arrangement according to claim 5, wherein the tension maintaining element is a cover glass that is fastened.

9. The arrangement according to claim 5, wherein the fixating device is further configured to connect the further structure's tensioned reflector portion with the rectangular reflective structure's tensioned reflector portion along the PTC's optical plane of symmetry.

10. The arrangement according to claim 5, the tensioning device is further configured to simultaneously when tensioning the reflector portion, tensioning also the further structure's reflector portion, the further structure being a part of the rectangular reflective structure and is connected by belonging to one and the same piece.

11. A production line for manufacturing a reflector for a Parabolic Trough solar Collector, PTC, comprising a plurality of arrangements according to claim 5.

* * * * *